Figure 1:
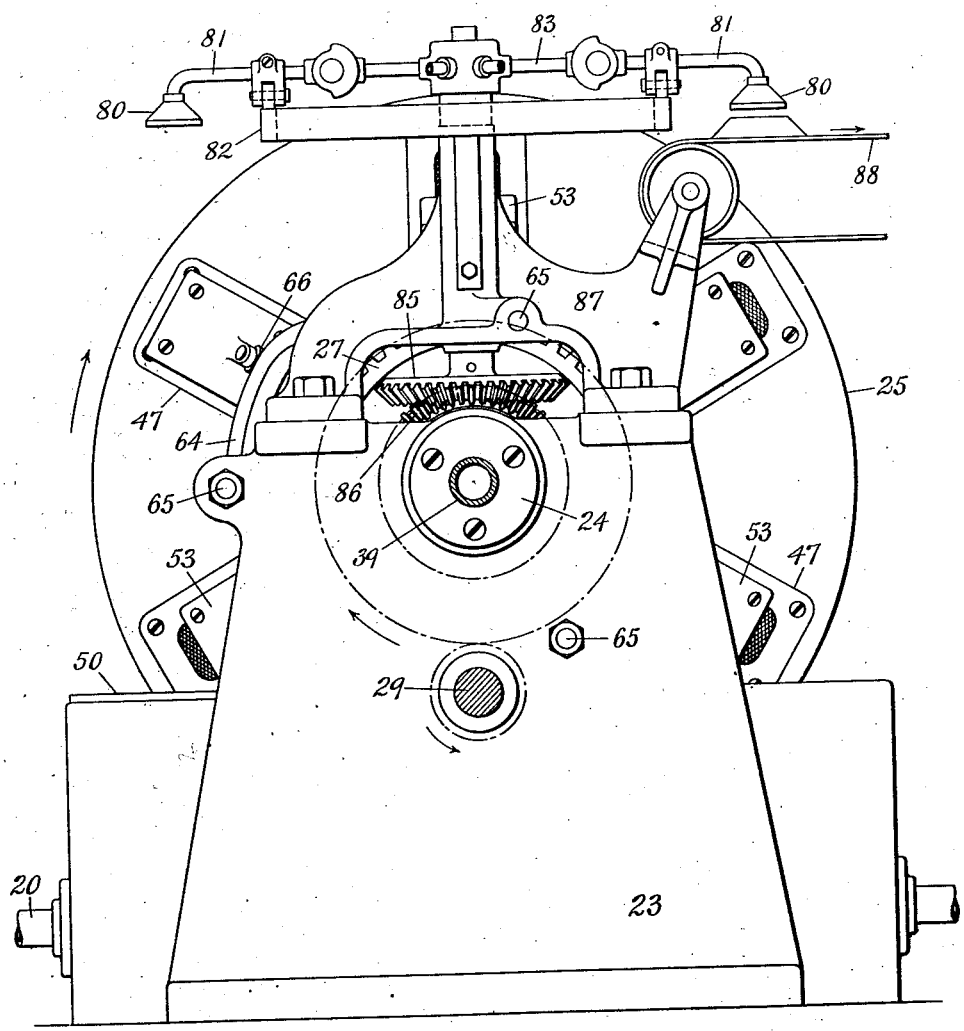

No. 877,579. PATENTED JAN. 28, 1908.
W. A. LORENZ.
APPARATUS FOR MOLDING PULP ARTICLES.
APPLICATION FILED MAR. 20, 1907.

6 SHEETS—SHEET 1.

Witnesses:
H. Mallner
Janette S. Ellsworth

Inventor
William A. Lorenz

No. 877,579. PATENTED JAN. 28, 1908.
W. A. LORENZ.
APPARATUS FOR MOLDING PULP ARTICLES.
APPLICATION FILED MAR. 20, 1907.

6 SHEETS—SHEET 3.

Witnesses:
H. Mallner
Janette S. Eelworth

Inventor
William A. Lorenz

No. 877,579. PATENTED JAN. 28, 1908.
W. A. LORENZ.
APPARATUS FOR MOLDING PULP ARTICLES.
APPLICATION FILED MAR. 20, 1907.

6 SHEETS—SHEET 5.

Witnesses:
H. Mallner
Janette S. Ellsworth

Inventor
William A. Lorenz

No. 877,579.  
PATENTED JAN. 28, 1908.  
W. A. LORENZ.  
APPARATUS FOR MOLDING PULP ARTICLES.  
APPLICATION FILED MAR. 20, 1907.

6 SHEETS—SHEET 6.

Witnesses:  
H. Mallner  
Janette S. Ellsworth

Inventor  
William A. Lorenz

UNITED STATES PATENT OFFICE.

WILLIAM A. LORENZ, OF HARTFORD, CONNECTICUT, ASSIGNOR OF ONE-HALF TO JOSEPH MERRITT, OF HARTFORD, CONNECTICUT.

APPARATUS FOR MOLDING PULP ARTICLES.

No. 877,579.  Specification of Letters Patent.  Patented Jan. 28, 1908.

Application filed March 20, 1907. Serial No. 363,431.

*To all whom it may concern:*

Be it known that I, WILLIAM A. LORENZ, a citizen of the United States, and resident of Hartford, in the county of Hartford and State of Connecticut, have invented certain new and useful Improvements in Apparatus for Molding Pulp Articles, of which the following is a full, clear, and exact specification.

My invention relates to a pulp molding machine, and the object thereof is to produce an apparatus which will manufacture pulp articles composed of layers of pulp of different grades.

My invention will be set forth in the claims.

In that embodiment of my invention as shown in the accompanying drawings, the improved machine comprises three vats, a cylindrical mold carrier traveling in one vat and having a plurality of mold-faces in both of the side faces of the carrier, each pair of mold-faces being connected with passageways in the carrier to channels in the hollow axle, one channel for suction, and one for air pressure; a plurality of coöperating mold-faces movable upon the carrier, there being one of these coöperating mold-faces for each of the mold-faces carried by the carrier, the movable mold-face being adapted to travel in the two outer vats, and later on to coöperate or nest with the carrier mold-faces, and to discharge the articles, the whole apparatus being connected with suitable driving mechanism, and a conveyer for taking off the articles as they are formed. In this machine the articles are molded in layers from two grades of pulp, and these layers are then combined. The shape of the mold depends upon the shape of the article. In order to make pulp vessels such as butter dishes, one mold-face is made concave or depressed, and the other mold-face is made convex or raised. One of the sets of mold-faces is carried upon a traveling or rotating carrier and the other of the sets of coöperating mold-faces is carried by movable or oscillating arms, connected to the carrier. One of the sets of mold-faces during their travel or rotation in one vat, which may be the depressed mold-faces, will have deposited thereon, one of the grades of pulp contained in its particular vat. The other set of mold-faces, which may be the raised mold-faces, are moved or rotated in two other vats, adjacent to the first vat containing another grade of pulp, and, while traveling in these vats, the desired amount of pulp will be deposited upon those mold-faces. Then at a point farther on in the travel of the coöperating pairs of mold-faces they are brought together while wet, and the layer upon one mold-face is deposited or nested in the other layer, supported by the other mold-face. The two layers are thus combined, and if desired they may be compressed between the two mold-faces. Then the coöperating mold-faces are separated, and a blast of air is employed, operating through one of the mold-faces, to detach the vessel from that face, and transfer it to the other face. The latter then moves away sufficiently to enable the completed vessel to be discharged therefrom, which is done preferably by means of a blast of air operating through the movable mold-face, thus detaching it therefrom. The vessel may be received by means of a suction take-off, or by any other suitable means.

The apparatus may be utilized as a machine for making two-layer pulp articles, upon one side of the carrier, or upon both sides of the carrier. In the latter instance the devices utilized to bring the two oppositely disposed pairs of mold-faces together to combine the pulp layers will exert a pressure towards one another, and thus prevent a side thrust upon the rotating carrier. When making two-layer pulp vessels in the oppositely disposed series of mold-faces, the central ones carried by the carrier travel or rotate in a central vat containing one grade of pulp, and the two outer series of mold-faces travel or rotate in two outer pulp vats, each one of which contains a different grade of pulp, thus producing two series of vessels at the same time. A cheap grade of pulp may be employed for that layer of the pulp vessel which does not need to have a fine appearance, and this layer may be the greater amount of pulp necessary in a complete vessel. The other layer of pulp may be of as fine a grade as desired, and may be the lesser amount required in the completed vessel. In the apparatus the two layers composing the vessel may be combined without compressing them, and they may be removed from the apparatus by suitable means, and then transferred to compressing devices detached from the machine.

Figure 2:
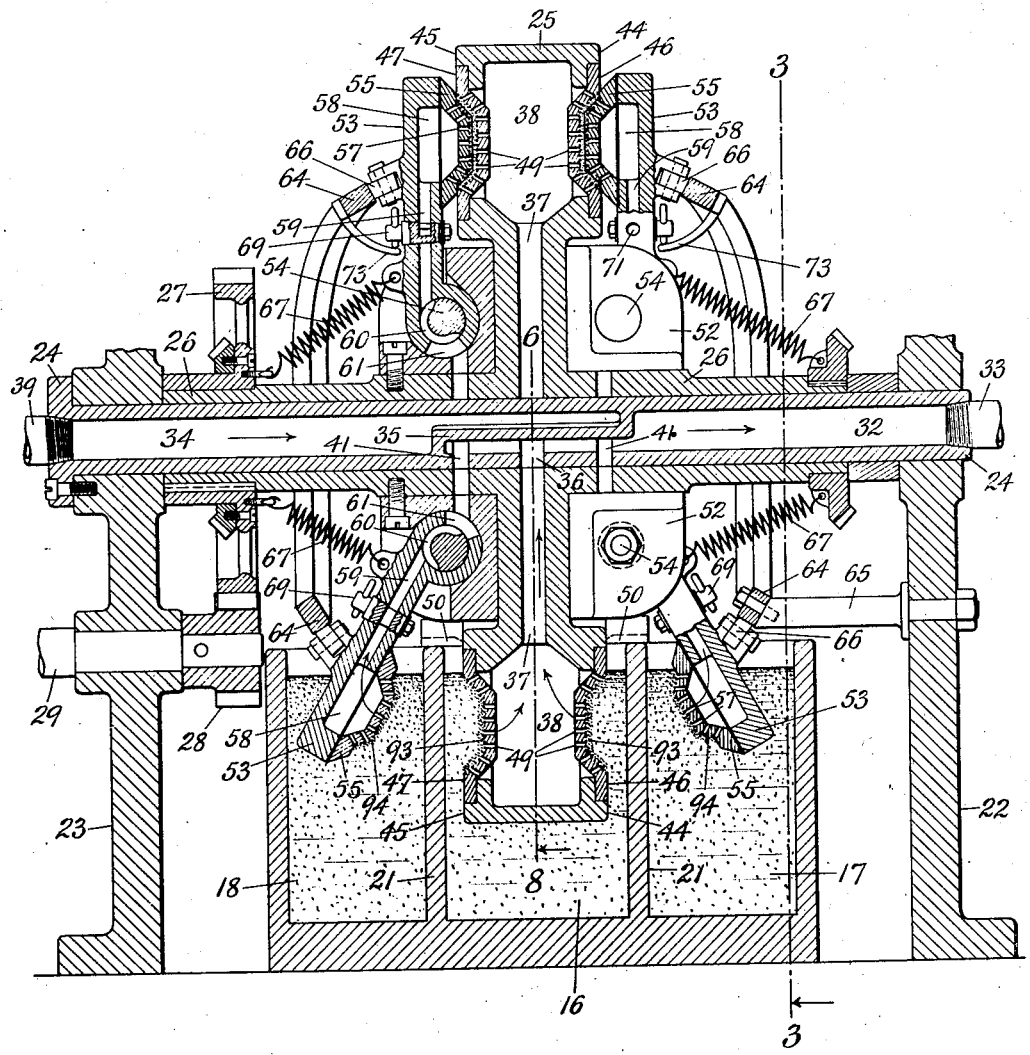
Figure 3:
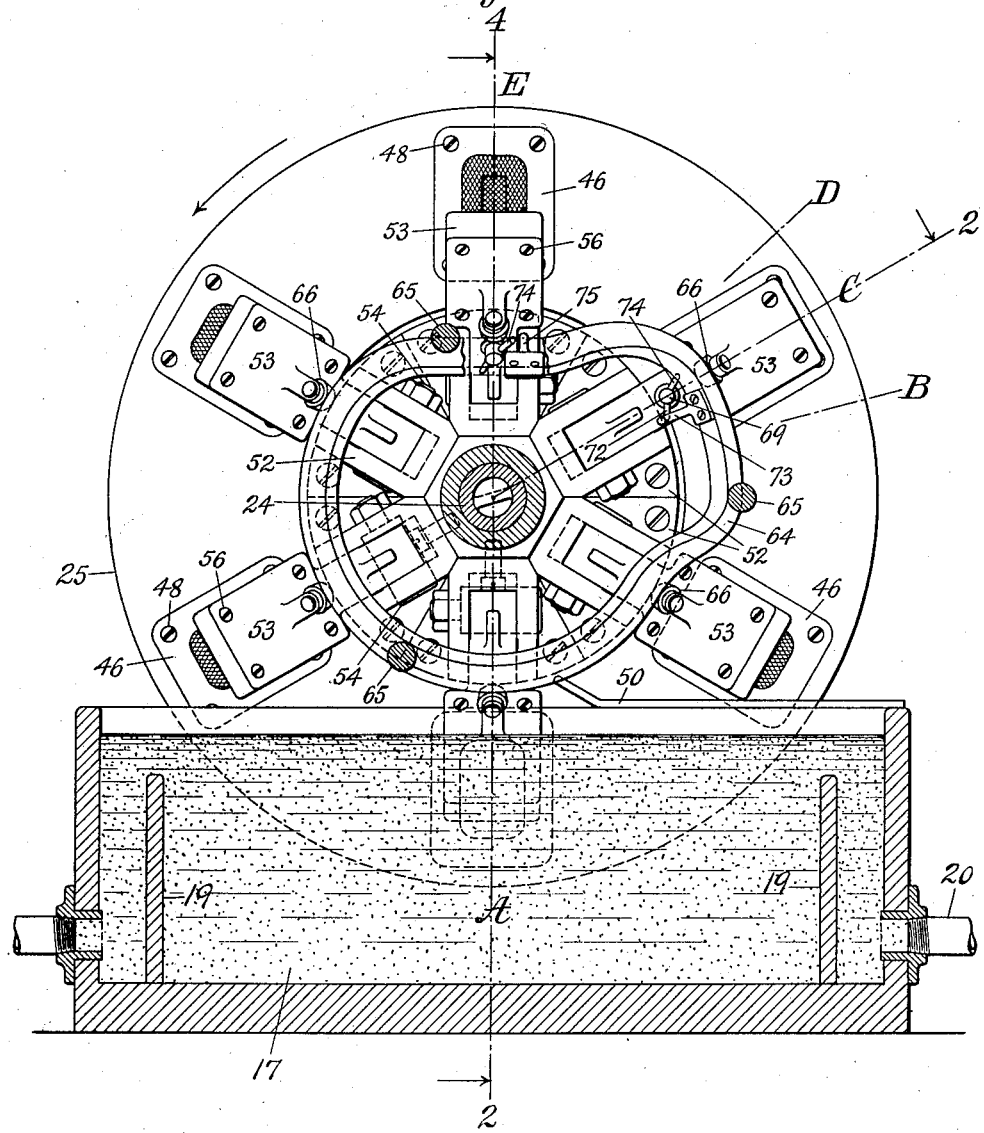

In the drawings, Figure 1 is a side view of the apparatus, looking at the left hand side of Fig. 2. Fig. 2 is a section on line 2—2 of Fig. 3. Fig. 3 is a section on line 3—3 of Fig.

Figure 4:
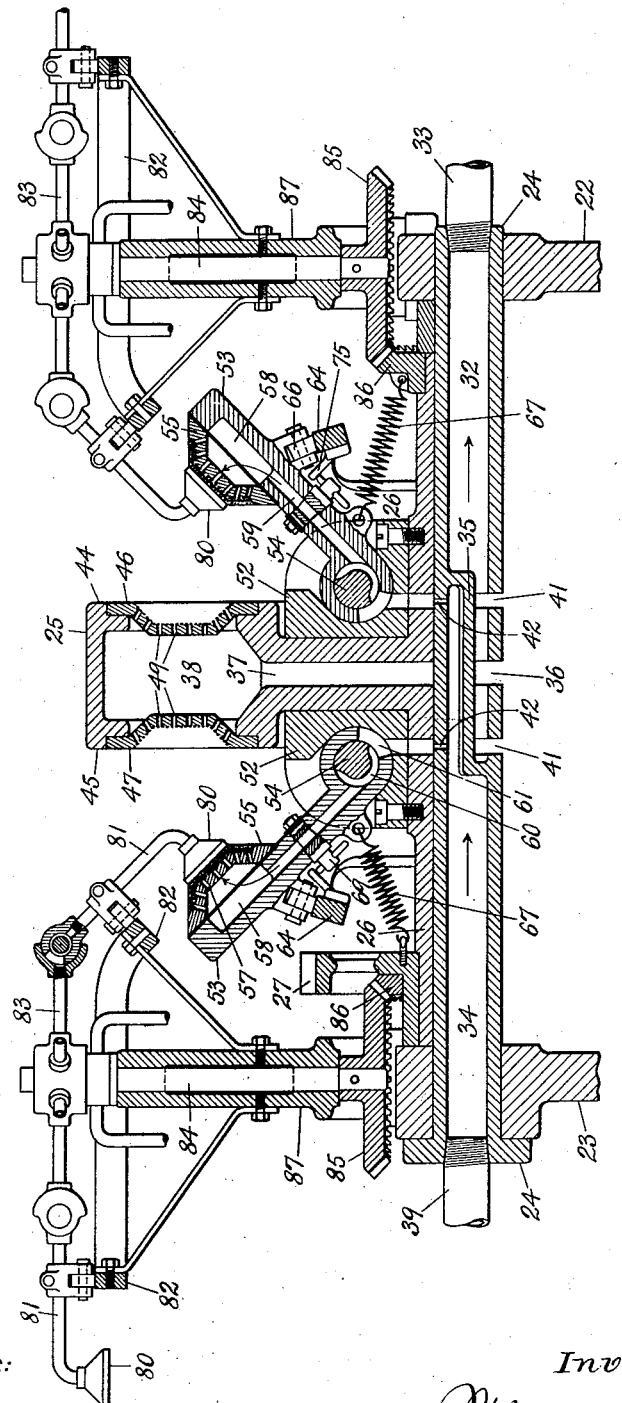
Figure 5:
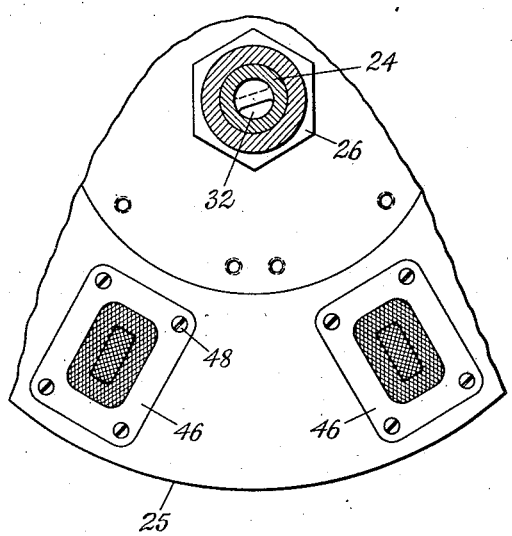
Figure 6:
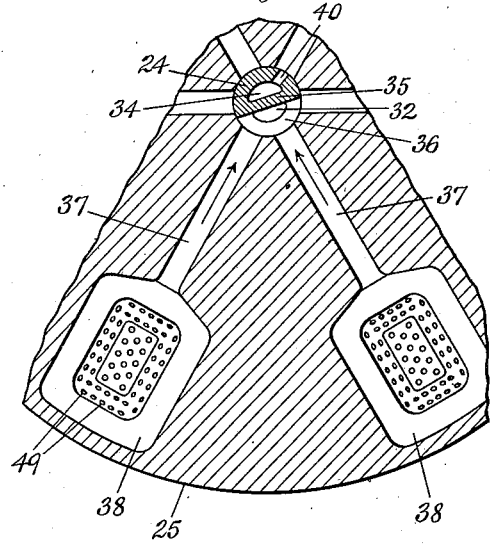
Figure 7:
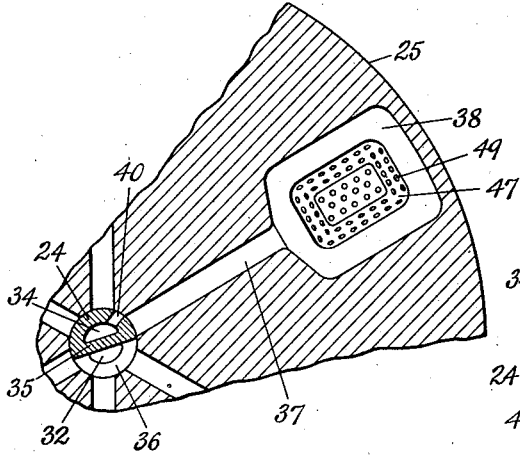
Figure 8:
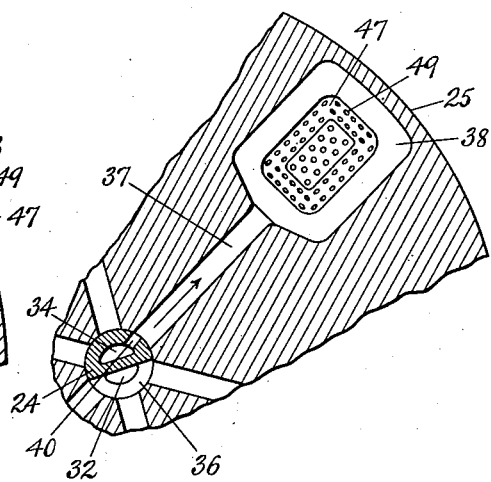
Figure 9:
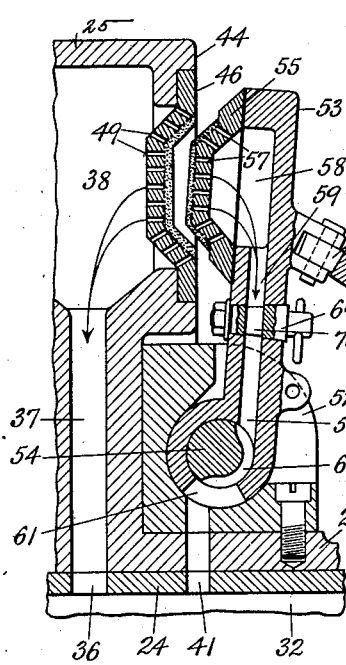
Figure 10:
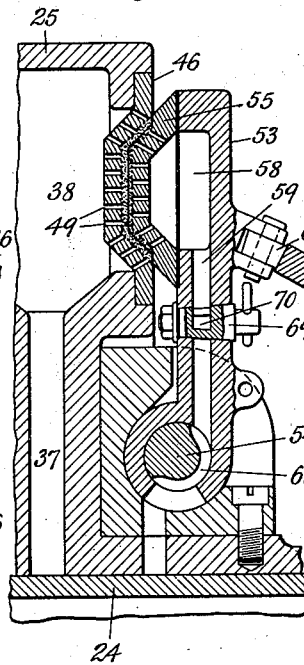
Figure 11:
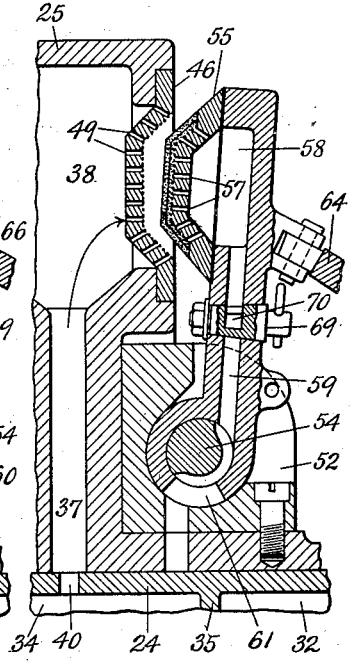
Figure 12:
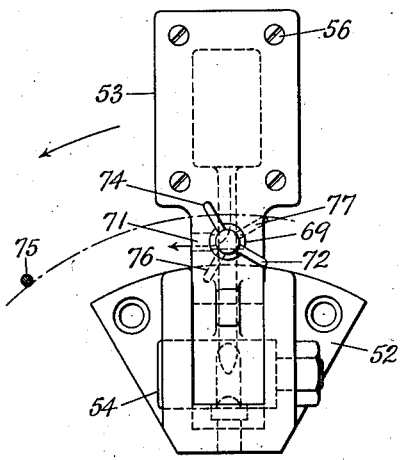
Figure 13:
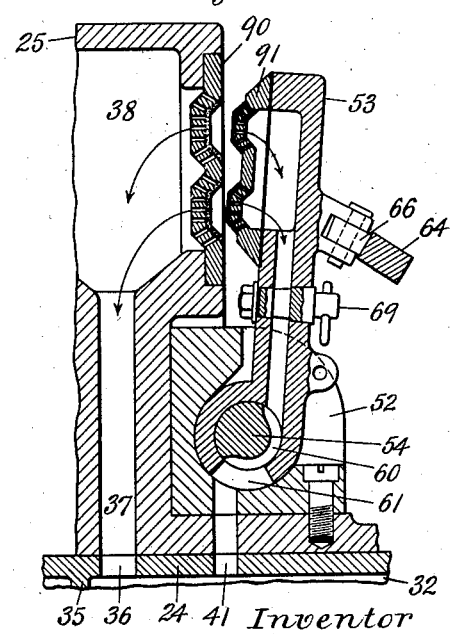

2. Fig. 4 is a sectional view of the upper portion of the machine on line 4 of Fig. 3 to a little below the center of the machine. Fig. 5 is a sectional view on line 3—3 of Fig 2 at position A in Fig. 3, with the movable arms and brackets removed, and without a vat. Fig. 6 is a sectional view on line 6—8, of Fig. 2 at position A in Fig. 3. Fig. 7 is a sectional view through the center of the machine at position C in Fig. 3. Fig. 8 is a sectional view on the center line of the machine at position D, shown in Fig. 3. Fig. 9 is a sectional view showing the two coöperating mold-faces upon a larger scale at position B, shown in Fig. 3. Fig. 10 shows the same parts in section at position C, shown in Fig. 3. Fig. 11 shows the same parts at position D, shown in Fig. 3. Fig. 12 shows the right hand view of what is shown in Fig. 10. Fig. 13 shows a sectional view of the mold carrier and the coöperating movable mold carrier with two coöperating mold-faces instead of one.

In the drawings three vats are shown, an inner vat 16 and two outer vats 17 and 18, the inner vat containing one grade of pulp, and the outer vats containing another grade of pulp. These vats are provided with suitable baffle plates 19, and inlet 20, for supplying pulp. Pulp is supplied to these vats by suitable apparatus not shown.

In the two uprights or main brackets 22 and 23, is placed a hollow fixed shaft 24, upon which rotates the mold carrier 25. The mold carrier 25 is provided with hubs 26, to one of which is secured a gear 27, which meshes in a pinion 28, upon a shaft 29, which is driven by suitable means, not shown.

The fixed shaft 24 is provided with a hollow portion 32 connected by a pipe 33 with suitable exhaust mechanism, not shown. The other end of the shaft 24 is provided with a hollow portion 34 connected with a pipe 39 to suitable air pressure apparatus not shown. The hollow portions 32 and 34 are separated by means of a partition 35.

The exhausting apparatus and air pressure apparatus are similar to those shown in the patent to Geo. R. Ward, No. 828,909 dated Aug. 21, 1906, and need not be particularly described, except that they operate in substantially the same manner, in order to provide suction and air pressure at suitable times.

The hollow portion 32 connects through an exhaust aperture 36 in the shaft 24 with a passageway 37 to a hollow chamber 38 in the mold carrier 25, below each pair of oppositely disposed mold-faces carried by that carrier. The shaft 24 is provided with a blast aperture 40, which at the proper time may communicate with the passageway 37 and chamber 38, in order to exert air pressure therein, and detach the pulp vessel from the mold-faces carried by the carrier. The shaft 24 is also provided with two exhaust apertures 41 connecting with passageways to the movable mold-faces carried by the carrier which will be described later on, and also with two blast apertures 42.

The carrier 25 is provided with two side faces, a right face 44 and a left face 45. Into these faces are inserted detachable molds 46 and 47, situated in the right and left faces respectively, and fastened to the carrier by means of suitable screws 48 which locate the molds thereon. These molds are shown in the drawing as being concave or depressed, but they may be of any shape desired, according to the nature of the article. They are provided with suitable draining apertures 49, wire netting and wire gauze shown in dotted line in the drawings over the holes. The rotating carrier 25, together with the mold-faces carried thereby, rotate in the central vat 16. When emerging from that vat the faces 46 and 47 are cleaned off by scrapers 50, thus removing the superfluous pulp that may hang to the smooth faces of the carrier.

The carrier 25 may be provided in one or both of its faces with as many mold-faces as desired, six being shown upon each side, in the drawings. The more mold-faces there are, the longer will they stay in the pulp vats, and the more pulp can they thus accumulate.

Upon the hubs 26 of the carrier 25 are secured a series of brackets 52. In these brackets are pivoted movable or oscillating arms 53, held in the brackets by means of through bolts 54. These arms carry detachable mold-faces 55, being attached to the arms by screws 56 which locate the molds on the arms. These mold-faces 55 are provided with drainage openings 57. The raised portions of these mold-faces are provided with suitable wire netting and wire gauze. The contour of these raised mold-faces depends upon the thickness of the vessel formed between the raised and the depressed mold-faces, and the raised one will be the smaller.

The movable arms 53 are provided with chambers 58 below the raised mold-faces. These chambers communicate with apertures 59, the latter leading to apertures 60 in the bolts 54, and then communicating with apertures 61 in the lower portion of the arms, the latter communicating with the apertures 41 and 42 in the fixed shaft 24, in order to be in communication with the exhaust or the blast apparatus at suitable intervals. The arms 53 are moved inwardly by means of tracks 64 fixed to the frame of the machine on either side of the rotating cylinder, as for example, upon posts 65. The oscillating arms 53 may be provided with rollers 66, running against the track 64. After the arms have been pushed inwardly by means of the tracks, they may be drawn outwardly by means of springs 67 attached to the hub 26 or to any suitable device carried thereby. The arms 53 therefore, receive a motion which separates them from the central mold carrier, and allows the molds carried by the arms to dip into the two outer pulp vats 17 and 18; after emerging from those vats they then move inwardly until the mold-faces 55 approach the mold-faces 46 and 47.

Each oscillating arm 53 is provided with a valve 69. It is furnished with an opening 70, which connects the upper and lower portions of the passageway 59, and which if turned, connects the upper part of passageway 59 to the outer atmosphere, through the opening 71.

The valve 69 is provided with a lower arm 72, which is closed during the travel of the carrier by a dog 73 attached to the track 64. The valve is also provided with an upper arm 74, which during the travel of the carrier strikes a dog 75 attached to the track. By referring to Fig. 12, it will be seen that the arm 72 moves from the dotted position 76 to the full line position of the arm 72, to move the valve from the exhaust connection shown in Fig. 9, to the position shown in Fig. 10, in which the valve is open to the atmosphere. The upper arm 74, after striking the fixed dog 75, moves to the dotted position 77, shown in Fig. 12. This closes the valve to the atmosphere and connects the upper and lower portions of the passageway 59.

After the desired layers of pulp have been deposited upon both mold-faces, these two layers are combined by bringing the mold-faces together. Then the combined vessel is transferred by atmospheric pressure upon the raised mold-face, which is then moved outwardly to the position shown in Fig. 4. In this position the completed pulp vessels may be taken or blown from the coöperating mold-faces and delivered to suitable take-off apparatus. These may be of the pneumatic type, which by means of suction lift the detached vessel from the movable mold-faces and deliver them to traveling belts or conveyers. These take-off devices form no part of the present invention, and will therefore only be referred to briefly. The pneumatic suction device consists of a suction hood 80 connected to a rising and falling arm 81, which receives that motion from a fixed track 82. The arm 81 is connected to a rotating spider 83, driven by the shaft 84, bevel gear 85, and bevel pinion 86 secured upon or driven by the hubs 26 of the mold carrier. The shaft 84 revolves in a bracket 87 fixed to the main frame of the machine. Suitable suction devices and blowing off devices, not shown, control the lifting and discharging of the pulp vessel to and from the hood 80, discharging the vessels upon a traveling belt 88. In the drawings in Fig. 4 two such discharging apparatus are shown, one for each side of the machine.

In Fig. 13 I have shown in section multiple mold-faces 90 upon the carrier 25, which faces are of the depressed kind; and also multiple coöperating raised mold-faces 91 upon the movable arm 53. Both the mold-faces are detachable from the carrier and the arm, in order to replace other mold-faces of other types. In place of a large mold-face, two or more mold-faces of a smaller size may be introduced into the machine in the same position occupied by the larger mold-faces, and are thus interchangeable. In this manner a larger output may be procured from the machine when making small size pulp vessels.

The operation of this machine is as follows:—The mold carrier 25 turns upon the fixed shaft 24, dipping the carrier molds 46 and 47 in succession into the vat 16. During this dipping operation, the exhaust or pumping apparatus exhausts the air from the interior 32 of the shaft 24, aperture 36 and from the passageway 37 and chamber 38. During this operation a layer of pulp 93 is deposited upon the depressed faces of the two molds 46 and 47, the thickness depending upon the speed with which the mold-faces move through the vat, and also upon the thickness of the pulp stuff. As the carrier rotates and the mold-faces emerge from the vat, the faces 44 and 45 of the carrier are scraped off by the scrapers 50, leaving the layers of pulp only in the depressed faces of the molds. At the same time the oscillating arms 53, carrying the coöperating mold-faces 55, are swung to the outward position shown in the lower part of Fig. 2. During the rotation of the carrier these mold-faces 55 dip in succession into the pulp vats 17 and 18, one series of mold-faces 55 dipping into the vat 17, and the other series of mold-faces on the other side, dipping into the vat 18. As the arms 53 move around, after emerging from the vats 17 and 18, they are swung inwardly towards the depressed mold-faces 46 and 47 by means of the track 64. During this operation the valve 69 in each arm is successively set so as to communicate through passage 70, with the upper and lower portions of the passageway 59. During the dipping operation and for a portion of the time thereafter, until just before arriving at the position C in Fig. 3, the exhausting apparatus exhausts the air through the opening 32 of the shaft 24, and through the openings 41, passageways 61, 60, 59, and chambers 58 and causes the layers of pulp 94 to be deposited upon the raised faces of the mold-faces 55. During the continued motion of these mold-faces from the vat up to the position C in Fig. 3, the exhausting apparatus drains water through the arms 53. The thickness of the pulp layers 94 will depend upon the speed with which these mold-faces move through the vats, and upon the thickness of the pulp-stuff. In the drawings I have shown a thick layer 93 upon the depressed mold-faces, and a thin layer 94 upon the raised mold-faces.

The position of the two coöperating mold-faces just before arriving at position C in Fig. 3 is represented in sectional view by Fig. 9, at about position B in Fig. 3, and the arrows below both of the mold-faces in Fig. 9 show the direction of the air pressure during the exhausting operation. When moving from position B to position C in Fig. 3, the mold-faces move towards each other, as shown in Fig. 10. During this latter motion, the valve arm 72 moves from position 76 to the position shown in Figs. 3 and 12, having been moved by the dog 73 attached to the track 64. In this position the valve 69 is open to the atmosphere through the aperture 70, 71. When the mold-faces have been brought together as shown in the upper portion of Fig. 2, the pulp layers carried by the mold-faces 55 are nested in the pulp layers carried by the mold-faces 46 and 47, and are then combined. The tracks 64 are so positioned that the rollers 66 during the rotation of the carrier move the oscillating arms 53, carrying the mold-faces 55 inwardly, exerting the desired amount of pressure upon the double pulp layers between the two coöperating pairs of mold-faces. As these mold-faces are oppositely disposed between the tracks, no side pressure is exerted against the central mold carrier 25.

In Figs. 5 and 6 connection between the chambers 38 and the hollow part 32 of the shaft 24 is shown. In Fig. 7 the chamber 38 and passageway 37 is shown cut off from the opening 36, which ends the connection with the exhaust apparatus, as shown in the upper portion of the machine in Fig. 2 and that position C in Fig. 3. The parts then move from the position shown in Fig. 7 to that shown in Fig. 8. This connects the air pressure passage 34 with the aperture 40, permitting air pressure to pass through the passageway 37 into the chamber 38, and through the perforated depressed mold-faces 46 and 47. The movable mold-faces then move from position C to position D, Fig. 3, and in doing so they are moved outwardly in succession to the position shown in Fig. 11, being drawn there by means of the springs 67. As the coöperating raised mold-faces 55 leave the depressed mold-faces 46, the air pressure in the chamber 38 forces the combined pulp vessels away from the depressed mold-faces, and holds them upon the movable mold-faces 53 during their outward motion; the air pressure at the start passing through the pulp vessels enters the chambers 58, and through the passageways 59, and through the valve openings 71 to the outer atmosphere. The movable mold-faces 55 then move from position D in Fig. 11 and Fig. 3, to the outward positions shown in Fig. 4. During this time the arm 74 of the valve 69 is turned from position 74 to 77 shown in Fig. 12. This turning of the valve establishes a connection through the valve with the upper and lower portions of the passageway 59 and closes that valve to the outer atmosphere. The outer positions of the two arms 53 shown in Fig. 4 is at E in Fig. 3. In this position the air pressure in the hollow part 34, passes through the openings 42, and through the various passages into the chambers 58. This air pressure is exerted through the openings in the mold-faces 55, and detaches the combined pulp vessels from the raised mold-faces in succession and delivers them to any suitable take-off means, which in the present instance comprise the suction hoods 80. These, by means of pneumatic pressure take the completed vessels and carry them around to, and drop them upon the conveying belts 88. The arms 53 then move successively toward the carrier mold-faces a little, in order to pass around and into the two vats 17 and 18, after which the operation of producing these pulp vessels is repeated upon each of the pairs of coöperating molds in succession.

This machine may be utilized as a single machine, making a series of duplex or two-layer vessels upon one side only of the carrier 25. Or if preferred, the vessels may be made at the same time upon both sides of the carrier. The machine may also produce one size of pulp vessel upon one side of the machine, and another size, or several sizes, such as are shown in Fig. 13, upon the other side of the machine.

In manufacturing articles from two grades of pulp, great economy can be effected in the cost of the article. The outer vats 17 and 18 may also be supplied with waterproof pulp-stuff, or the inner vat may be thus supplied, making one of the layers of the vessel water-repellent.

Many modifications may be made in the mechanical details of this apparatus, without departing from the spirit of the invention. For example, the movable arms carried by the rotating carrier which support the coöperating mold-faces may be made slidable upon that carrier, instead of having an oscillating movement, so long as the parts perform the functions described. These movable arms may also be controlled by closed cams, thus dispensing with the return springs.

The mold-faces in the specification have been termed "depressed" and "raised" mold-forms; these terms are used for convenience. If the form of the article demands it, one mold-form may be depressed, and the other may be flat, or also depressed, when making disks, for example. Either form may be carried on the carrier or the carrier arms, provided the mold-faces during their traveling movement receive separate layers of pulp and then coöperate to combine the layers into a vessel or article having more than one layer.

As a machine for making separate layers of pulp upon coöperating mold-faces, and then combining them to form a multiple layer article is novel in the art, I desire to broadly cover these devices when carried by traveling carriers, no matter in what particular manner they travel or receive the separate layers of pulp, as long as they coöperate to combine the layers in one completed article.

What I claim:

1. In a pulp molding machine in combination, a mold face, a coöperating mold face, means to deposit pulp upon each mold face, means for pressing the two faces together to form a single article, and means to remove one mold face therefrom, leaving said two-layer article on said other face.

2. In a pulp molding machine, in combination, a mold-face, a coöperating mold-face, two pulp vats, each containing pulp, means to deposit pulp upon the first mold-face from one vat, means to deposit pulp upon the coöperating mold-face from the other vat, means to nest the layer of pulp carried by one mold-face in the layer supported by the other mold-face, and to combine the layers to form the article.

3. In a pulp molding machine, in combination, a traveling mold-face, a coöperating mold-face, two pulp vats, each containing a different grade of pulp, means to deposit pulp upon the traveling mold-face from one vat, means to deposit pulp upon the coöperating mold-face from the other vat, means to nest the layer of pulp carried by one mold-face in the layer supported by the other mold-face, and to combine the layers to form the article.

4. In a pulp molding machine, in combination, a traveling mold-face, a coöperating mold-face, two pulp vats, each containing a different grade of pulp, means to deposit pulp upon the traveling mold-face from one vat, means to deposit pulp upon the coöperating mold-face from the other vat, means to nest the layer of pulp carried by one mold-face in the layer supported by the other mold-face, and to combine and compress the layers to form the article.

5. In a pulp molding machine, in combination, a traveling mold-face, a coöperating mold-face, two pulp vats, each containing a different grade of pulp, means to deposit pulp upon the traveling mold-face from one vat, means to deposit pulp upon the coöperating mold-face from the other vat, means to nest the layer of pulp carried by one mold-face in the layer supported by the other mold-face, and to combine the layers to form the article, and means to subsequently discharge the formed article from the mold-face to which it was transferred.

6. In a pulp molding machine, in combination, a traveling mold-face, a coöperating mold-face, two vats, each containing a different grade of pulp, means to deposit a layer of pulp upon the traveling mold-face from one vat, means to deposit a layer of pulp upon the coöperating mold-face from the other vat, means to bring the traveling and the coöperating mold-faces together and nest the layers of pulp carried by the two faces, means to combine the layer of pulp carried by one mold-face with the layer supported by the other mold-face, and means to separate the two mold-faces.

7. In a pulp molding machine, in combination, a traveling mold-face, a coöperating mold-face, two vats, each containing a different grade of pulp, means to deposit a layer of pulp upon the traveling mold-face from one vat, means to deposit a layer of pulp upon the coöperating mold-face from the other vat, means to bring the traveling and the coöperating mold-faces together and nest the layers of pulp carried by the two faces, means to combine and compress the layer of pulp carried by one mold-face with the layer supported by the other mold-face, and means to separate the two mold-faces.

8. In a pulp molding machine, in combination, a traveling mold-face, a coöperating mold-face, two vats, each containing a different grade of pulp, means to deposit a layer of pulp upon the traveling mold-face from one vat, means to deposit a layer of pulp upon the coöperating mold-face from the other vat, means to bring the traveling and the coöperating mold-faces together and nest the layers of pulp carried by the two faces, means to combine the layer of pulp carried by one mold-face with the layer supported by the other mold-face, means to separate the two mold-faces, and means to subsequently discharge the formed article from the mold-face to which it was transferred.

9. In a pulp molding machine, in combination, a traveling mold-face, a coöperating mold-face, two pulp vats each containing a different grade of pulp, means to deposit a layer of pulp upon the traveling mold-face from one vat, means to deposit a layer of pulp upon the coöperating mold-face from the other vat, means to bring the traveling and the coöperating mold-faces together and nest the layers of pulp carried by the two faces, means to combine the layer of pulp carried by one mold-face, with the layer supported by the other mold-face, means to separate the two mold-faces, and air pressure means to transfer the articles from one mold-face to the other mold-face.

10. In a pulp molding machine, in combination, a traveling mold-face, a coöperating mold-face, two pulp vats each containing a different grade of pulp, means to deposit a layer of pulp upon the traveling mold-face from one vat, means to deposit a layer of pulp upon the coöperating mold-face from the other vat, means to bring the traveling and the coöperating mold-faces together and nest the layers of pulp carried by the two faces, means to combine and compress the layer of pulp carried by one mold-face, with the layer supported by the other mold-face, means to separate the two mold-faces, and air pressure means to transfer the articles from one mold-face to the other mold-face.

11. In a pulp molding machine, in combination, a traveling mold-face, a coöperating mold-face, two pulp vats each containing a different grade of pulp, means to deposit a layer of pulp upon the traveling mold-face from one vat, means to deposit a layer of pulp upon the coöperating mold-face from the other vat, means to bring the traveling and the coöperating mold-faces together and nest the layers of pulp carried by the two faces, means to combine the layer of pulp carried by one mold-face, with the layer supported by the other mold-face, means to separate the two mold-faces, air pressure means to transfer the articles from one mold-face to the other mold-face, and means to subsequently discharge the formed article from the mold-face to which it was transferred.

12. In a pulp molding machine, in combination, a traveling mold-face, a coöperating mold-face, two pulp vats into each of which the mold-faces, respectively, dip to receive a layer of pulp, means to deposit a layer of pulp on both of the mold-faces, and means to nest the layer of pulp carried by one mold-face, in the layer supported by the other mold-face, at a point farther on in the travel of the molds to form the article.

13. In a pulp molding machine, in combination, a traveling mold-face, a coöperating mold-face, two pulp vats into each of which the mold-faces, respectively, dip to receive a layer of pulp, means to deposit a layer of pulp on both of the mold-faces, means to nest the layer of pulp carried by one mold-face in the layer supported by the other mold-face, at a point farther on in the travel of the molds to form the article, and means to compress the two layers of pulp between the mold-faces.

14. In a pulp molding machine, in combination, a traveling mold-face, a coöperating mold-face, two pulp vats into each of which the mold-faces, respectively, dip to receive a layer of pulp, means to deposit a layer of pulp on both of the mold-faces, means to nest the layer of pulp carried by one mold-face in the layer supported by the other mold-face, at a point farther on in the travel of the molds to form the article, and means to subsequently discharge the formed article from the mold-face to which it was transferred.

15. In a pulp molding machine, in combination, a traveling mold-face, a coöperating mold-face, two vats into each of which the mold-faces, respectively, dip to receive a layer of pulp, means to deposit a layer of pulp on both of the mold-faces, means to bring the carrier and the coöperating mold-faces together, and nest the layers of pulp carried by the two faces, and means to combine the layer of pulp carried by one of the mold-faces with the layer supported by the other mold-face at a point farther on in the travel of the molds.

16. In a pulp molding machine, in combination, a traveling mold-face, a coöperating mold-face, two vats into each of which the mold-faces, respectively, dip to receive a layer of pulp, means to deposit a layer of pulp on both of the mold-faces, means to bring the carrier and the coöperating mold-faces together and nest the layers of pulp carried by the two faces, and means to combine and compress the layer of pulp carried by one of the mold-faces with the layer supported by the other mold-face at a point farther on in the travel of the molds.

17. In a pulp molding machine, in combination, a traveling mold-face, a coöperating mold-face, two vats into each of which the mold-faces, respectively, dip to receive a layer of pulp, means to deposit a layer of pulp on both of the mold-faces, means to bring the carrier and the coöperating mold-faces together and nest the layers of pulp carried by the two faces, means to combine the layer of pulp carried by one of the mold-faces with the layer supported by the other mold-face at a point farther on in the travel of the molds, and means to subsequently discharge the formed article from the mold-face to which it was transferred.

18. In a pulp molding machine, in combination, a traveling mold-face, a coöperating mold-face, two vats into each of which the mold-faces, respectively, dip to receive a layer of pulp, means to deposit a layer of pulp on both of the mold-faces, means to bring the carrier and the coöperating mold-faces together and nest the layers of pulp carried by the two faces, means to combine the layer of pulp carried by one mold-face with the layer supported by the other mold-face, and means to separate the two mold-faces.

19. In a pulp molding machine, in combination, a traveling mold-face, a coöperating mold-face, two vats into each of which the mold-faces, respectively, dip to receive a layer of pulp, means to deposit a layer of pulp on both of the mold-faces, means to bring the carrier and the coöperating mold-faces together and nest the layers of pulp carried by the two faces, means to combine and compress the layer of pulp carried by one mold-face with the layer supported by the other mold-face, and means to separate the two mold-faces.

20. In a pulp molding machine, in combination, a traveling mold-face, a coöperating mold-face, two vats into each of which the mold-faces, respectively, dip to receive a layer of pulp, means to deposit a layer of pulp on both of the mold-faces, means to bring the carrier and the coöperating mold-faces together and nest the layers of pulp carried by the two faces, means to combine the layer of pulp carried by one mold-face with the layer supported by the other mold-face, means to separate the two mold-faces, and means to subsequently discharge the formed article from the mold-face to which it was transferred.

21. In a pulp molding machine, in combination, a traveling mold-face, a coöperating mold-face, two pulp vats into each of which the mold-faces, respectively, dip to receive a layer of pulp, suction apparatus for depositing a layer of pulp on both of the mold-faces, means to bring the carrier and the coöperating mold-faces together and nest the layers of pulp carried by the two faces, means to combine the layer of pulp carried by one mold-face with the layer supported by the other mold-face, means to separate the two mold-faces, and air pressure means to transfer the article from one mold-face to the other mold-face.

22. In a pulp molding machine, in combination, a traveling mold-face, a coöperating mold-face, two pulp vats into each of which the mold-faces, respectively, dip to receive a layer of pulp, suction apparatus for depositing a layer of pulp on both of the mold-faces, means to bring the carrier and the coöperating mold-faces together and nest the layers of pulp carried by the two faces, means to combine and compress the layer of pulp carried by one mold-face with the layer supported by the other mold-face, means to separate the two mold-faces, and air pressure means to transfer the article from one mold-face to the other mold-face.

23. In a pulp molding machine, in combination, a traveling mold-face, a coöperating mold-face, two pulp vats into each of which the mold-faces, respectively, dip to receive a layer of pulp, suction apparatus for depositing a layer of pulp on both of the mold-faces, means to bring the carrier and the coöperating mold-faces together and nest the layers of pulp carried by the two faces, means to combine the layer of pulp carried by one mold-face with the layer supported by the other mold-face, means to separate the two mold-faces, air pressure means to transfer the article from one mold-face to the other mold-face, and means to subsequently discharge the formed article from the mold-face to which it was transferred.

24. In a pulp molding machine, in combination, a rotating carrier provided with a mold-face, a movable arm carried by the carrier and provided with a mold-face, for coöperation with the mold-face on the carrier, two pulp vats into each of which the mold-faces, respectively, dip to receive a layer of pulp means for rotating the carrier with its mold-face in one vat, and the movable arm with its coöperating mold-face in the other vat, suction apparatus for depositing a layer of pulp on both of the mold-faces, means to bring the carrier mold-face and coöperating mold-faces together and nest the layers of pulp carried by the two faces, means to combine the layer of pulp carried by one mold-face with the layer supported by the other mold-face, means to separate the two mold-faces, and air pressure means to transfer the article from one mold-face to the other mold-face.

25. In a pulp molding machine, in combination, a rotating carrier provided with a mold-face, a movable arm carried by the carrier and provided with a mold-face for coöperation with the mold-face on the carrier, two pulp vats into each of which the mold-faces, respectively, dip to receive a layer of pulp, means for rotating the carrier with its mold-face in one vat and the movable arm with its coöperating mold-face in the other vat, suction apparatus for depositing a layer of pulp on both of the mold-faces, means to bring the carrier mold-face and coöperating mold-faces together and nest the layers of pulp carried by the two faces, means to combine and compress the layer of pulp carried by one mold-face with the layer supported by the other mold-face, means to separate the two mold-faces, and air pressure means to transfer the article from one mold-face to the other mold-face.

26. In a pulp molding machine, in combination, a rotating carrier provided with a mold-face, a movable arm carried by the carrier and provided with a mold-face for coöperation with the mold-face on the carrier, two pulp vats into each of which the mold-faces, respectively, dip to receive a layer of pulp, means for rotating the carrier with its mold-face in one vat, and the movable arm with its coöperating mold-face in another vat, suction apparatus for depositing a layer of pulp on both of the mold-faces, means to bring the carrier mold-face and coöperating mold-faces together and nest the layers of pulp carried by the two faces, means to combine the layer of pulp carried by one mold-face with the layer supported by the other mold-face, means to separate the two mold-faces, air pressure means to transfer the article from one mold-face to the other mold-face, and means to subsequently discharge the formed article from the mold-face to which it was transferred.

27. In a pulp molding machine, in combination, a rotating carrier provided with a mold-face, an oscillating arm carried by the carrier and provided with a coöperating mold-face, two pulp vats into each of which the mold-faces, respectively, dip to receive a layer of pulp, means for rotating the carrier with its mold-face in one vat, and the oscillating arm with its coöperating mold-face in another vat, suction apparatus for depositing a layer of pulp on both of the mold-faces, a cam to bring the depressed and raised mold-faces together and nest the layers of pulp carried by the faces, means to combine the layer of pulp carried by one mold-face with the layer supported by the other mold-face, means to separate the two mold-faces, and air pressure means to transfer the article from one mold-face to the other mold-face.

28. In a pulp molding machine, in combination, a rotating carrier provided with a mold-face, an oscillating arm carried by the carrier and provided with a coöperating mold-face, two pulp vats into each of which the mold-faces, respectively, dip to receive a layer of pulp, means for rotating the carrier with its mold-face in one vat, and the oscillating arm with its coöperating mold-face in another vat, suction apparatus for depositing a layer of pulp on both of the mold-faces, a cam to bring the depressed and raised mold-faces together and nest the layers of pulp carried by the faces, means to combine and compress the layer of pulp carried by one mold-face with the layer supported by the other mold-face, means to separate the two mold-faces, and air pressure means to transfer the article from one mold-face to the other mold-face.

29. In a pulp molding machine, in combination, a rotating carrier provided with a mold-face, an oscillating arm carried by the carrier and provided with a coöperating mold-face, two pulp vats into each of which the mold-faces, respectively, dip to receive a layer of pulp, means for rotating the carrier with its mold-face in one vat, and the oscillating arm with its coöperating mold-face in another vat, suction apparatus for depositing a layer of pulp on both of the mold-faces, a cam to bring the depressed and raised mold-faces together and nest the layers of pulp carried by the faces, means to combine the layer of pulp carried by one mold-face with the layer supported by the other mold-face, means to separate the two mold-faces, air pressure means to transfer the article from one mold-face to the other mold-face, and means to subsequently discharge the formed article from the mold-face to which it was transferred.

30. In a pulp molding machine, in combination, a rotating carrier provided with a mold-face, an oscillating arm carried by the carrier and provided with a coöperating mold-face, two pulp vats into each of which the mold-faces, respectively, dip to receive a layer of pulp, means for rotating the carrier with its mold-face in one vat, and the oscillating arm with its coöperating mold-face in another vat, a valve in the oscillating arm, means to operate the valve, suction apparatus for depositing a layer of pulp on both of the mold-faces, a cam to bring the carrier and coöperating mold-faces together and nest the layers of pulp carried by the two faces, means to combine the layer of pulp carried by one mold-face with the layer supported by the other mold-face, means to separate the two mold-faces, and air pressure means to transfer the article from one mold-face to the other mold-face.

31. In a pulp molding machine, in combination, a rotating carrier provided with a mold-face, an oscillating arm carried by the carrier and provided with a coöperating mold-face, two pulp vats into each of which the mold-faces, respectively, dip to receive a layer of pulp, means for rotating the carrier with its mold-face in one vat, and the oscillating arm with its coöperating mold-face in another vat, a valve in the oscillating arm, means to operate the valve, suction apparatus for depositing a layer of pulp on both of the mold-faces, a cam to bring the carrier and coöperating mold-faces together and nest the layers of pulp carried by the two faces, means to combine and compress the layer of pulp carried by one mold-face with the layer supported by the other mold-face, means to separate the two mold-faces, and air pressure means to transfer the article from one mold-face to the other mold-face.

32. In a pulp molding machine, in combination, a rotating carrier provided with a mold-face, an oscillating arm carried by the carrier and provided with a coöperating mold-face, two pulp vats into each of which the mold-faces, respectively, dip to receive a layer of pulp, means for rotating the carrier with its mold-face in one vat, and the oscillating arm with its coöperating mold-face in another vat, a valve in the oscillating arm, means to operate the valve, suction apparatus for depositing a layer of pulp on both of the mold-faces, a cam to bring the carrier and coöperating mold-faces together and nest the layers of pulp carried by the two faces, means to combine the layer of pulp carried by one mold-face with the layer supported by the other mold-face, means to separate the two mold-faces, air pressure means to transfer the article from one mold-face to the other mold-face, and means to subsequently discharge the formed article from the mold-face to which it was transferred.

33. In a pulp molding machine, in combination, a traveling carrier provided with two oppositely disposed mold-faces in the two opposite side faces of the carrier, two movable arms having two coöperating mold-faces arranged for movement toward the carrier mold-faces, three vats, means for moving the carrier mold-faces in the inner vat, and the coöperating mold-faces in the two outer vats, respectively, suction apparatus for depositing a layer of pulp on both of the mold-faces, oppositely disposed means to bring the oppositely disposed carrier and the coöperating mold-faces together and nest the respective pairs of layers of pulp carried by the faces, means to combine the layers of pulp carried by one pair of mold-faces with the other layers supported by the other pair of mold-faces, means to separate the respective pairs of mold-faces, and air pressure means to transfer the articles from one of the pairs of mold-faces to the other mold-faces.

34. In a pulp molding machine, in combination, a traveling carrier provided with two oppositely disposed mold-faces in the two opposite side faces of the carrier, two movable arms having two coöperating mold-faces arranged for movement toward the carrier mold-faces, three vats, means for moving the carrier mold-faces in the inner vat, and the coöperating mold-faces in the two outer vats, respectively, suction apparatus for depositing a layer of pulp on both of the mold-faces, oppositely disposed means to bring the oppositely disposed carrier and the coöperating mold-faces together and nest the respective pairs of layers of pulp carried by the faces, means to combine and compress the layers of pulp carried by one pair of mold-faces with the other layers supported by the other pair of mold-faces, means to separate the respective pairs of mold-faces, and air pressure means to transfer the articles from one of the pairs of mold-faces to the other mold-faces.

35. In a pulp molding machine, in combination, a traveling carrier provided with two oppositely disposed mold-faces in the two opposite side faces of the carrier, two movable arms having two coöperating mold-faces arranged for movement toward the carrier mold-faces, three vats, means for moving the carrier mold-faces in the inner vat, and the coöperating mold-faces in the two outer vats, respectively, suction apparatus for depositing a layer of pulp on both of the mold-faces, oppositely disposed means to bring the oppositely disposed carrier and the coöperating mold-faces together and nest the respective pairs of layers of pulp carried by the faces, means to combine the layers of pulp carried by one pair of mold-faces with the other layers supported by the other pair of mold-faces, means to separate the respective pairs of mold-faces, air pressure means to transfer the articles from one of the pairs of mold-faces to the other mold-faces, and means to subsequently discharge the formed articles from the mold-faces to which they were transferred.

36. In a pulp molding machine, in combination, a rotating carrier provided with two oppositely disposed mold-faces in the two opposite side faces of the carrier, two movable arms having two coöperating mold-faces arranged for movement toward the carrier mold-faces, three vats, means for moving the carrier mold-faces in the inner vat, and the coöperating mold-faces in the two outer vats, respectively, suction apparatus for depositing layers of pulp on all four mold-faces, oppositely disposed means to bring the two oppositely disposed carrier and coöperating mold-faces together and nest the respective layers of pulp carried by the faces, means to combine the layers of pulp carried by one pair of mold-faces with the other layers supported by the other pair of mold-faces, means to separate the respective pairs of mold-faces, and air pressure means to transfer the articles from one of the pairs of mold-faces to the other mold-faces.

37. In a pulp molding machine, in combination, a rotating carrier provided with two oppositely disposed mold-faces in the two opposite side faces of the carrier, two movable arms having two coöperating mold-faces arranged for movement toward the carrier mold-faces, three vats, means for moving the carrier mold-faces in the inner vat, and the coöperating mold-faces in the two outer vats, respectively, suction apparatus for depositing layers of pulp on all four mold-faces, oppositely disposed means to bring the two oppositely disposed carrier and coöperating mold-faces together and nest the respective layers of pulp carried by the faces, means to combine and compress the layers of pulp carried by one pair of mold-faces with the other layers supported by the other pair of mold-faces, means to separate the respective pairs of mold-faces, and air pressure means to transfer the articles from one of the pairs of mold-faces to the other mold-faces.

38. In a pulp molding machine, in combination, a rotating carrier provided with two oppositely disposed mold-faces in the two opposite side faces of the carrier, two movable arms having two coöperating mold-faces arranged for movement toward the carrier mold-faces, three vats, means for moving the carrier mold-faces in the inner vat, and the coöperating mold-faces in the two outer vats, respectively, suction apparatus for depositing layers of pulp on all four mold-faces, oppositely disposed means to bring the two oppositely disposed carrier and coöperating mold-faces together and nest the respective layers of pulp carried by the faces, means to combine the layers of pulp carried by one pair of mold-faces with the other layers supported by the other pair of mold-faces, means to separate the respective pairs of mold-faces, air pressure means to transfer the articles from one of the pairs of mold-faces to the other mold-faces, and means to subsequently discharge the formed articles from the mold to which they were transferred.

39. In a pulp molding machine, in combination, a rotating carrier provided with two oppositely disposed mold-faces in the two opposite side faces of the carrier, two movable arms having two coöperating mold-faces arranged for movement toward the carrier mold-faces, three vats, means for moving the carrier mold-faces in the inner vat, and the coöperating mold-faces in the two outer vats, respectively, suction apparatus for depositing layers of pulp on all four mold-faces, oppositely disposed cams to bring the two oppositely disposed carrier and coöperating mold-faces together, and nest the respective layers of pulp carried by the faces, means to combine the layers of pulp carried by one pair of mold-faces with the other layers supported by the other pair of mold-faces, means to separate the respective pairs of mold-faces, and air pressure means to transfer the article from one of the pairs of mold-faces to the other mold-faces.

40. In a pulp molding machine, in combination, a rotating carrier provided with two oppositely disposed mold-faces in the two opposite side faces of the carrier, two movable arms having two coöperating mold-faces arranged for movement toward the carrier mold-faces, three vats, means for moving the carrier mold-faces in the inner vat, and the coöperating mold-faces in the two outer vats, respectively, suction apparatus for depositing layers of pulp on all four mold-faces, oppositely disposed cams to bring the two oppositely disposed carrier and coöperating mold-faces together, and nest the respective layers of pulp carried by the faces, means to combine and compress the layers of pulp carried by one pair of mold-faces with the other layers supported by the other pair of mold-faces, means to separate the respective pairs of mold-faces, and air pressure means to transfer the article from one of the pairs of mold-faces to the other mold-faces.

41. In a pulp molding machine, in combination, a rotating carrier provided with two oppositely disposed mold-faces in the two opposite side faces of the carrier, two movable arms having two coöperating mold-faces arranged for movement toward the carrier mold-faces, three vats, means for moving the carrier mold-faces in the inner vat, and the coöperating mold-faces in the two outer vats, respectively, suction apparatus for depositing layers of pulp on all four mold-faces, oppositely disposed cams to bring the two oppositely disposed carrier and coöperating mold-faces together, and nest the respective layers of pulp carried by the faces, means to combine the layers of pulp carried by one pair of mold-faces with the other layers supported by the other pair of mold-faces, means to separate the respective pairs of mold-faces, air pressure means to transfer the article from one of the pairs of mold-faces to the other mold-faces, and means to subsequently discharge the formed articles from the mold-faces to which they were transferred.

42. In a pulp molding machine, in combination, a rotating carrier provided with two oppositely disposed mold-faces in the two opposite side faces of the carrier, two movable arms having two coöperating mold-faces arranged for movement toward the carrier mold-faces, three vats, means for moving the carrier mold-faces in the inner vat, and the coöperating mold-faces in the two outer vats, respectively, a valve in each of the oscillating arms, means to operate the valves, suction apparatus for depositing layers of pulp on all four mold-faces, oppositely disposed cams to bring the two oppositely disposed carrier and coöperating mold-faces together and nest the respective layers of pulp carried by the faces, means to combine the layers of pulp carried by one pair of mold-faces with the other layer supported by the other pair of mold-faces, means to separate the respective pairs of mold-faces, and air pressure means to transfer the articles from one of the pairs of mold-faces to the other mold-faces.

43. In a pulp molding machine, in combination, a rotating carrier provided with two oppositely disposed mold-faces in the two opposite side faces of the carrier, two movable arms having two coöperating mold-faces arranged for movement toward the carrier mold-faces, three vats, means for moving the carrier mold-faces in the inner vat, and the coöperating mold-faces in the two outer vats, respectively, a valve in each of the oscillating arms, means to operate the valves, suction apparatus for depositing layers of pulp on all four mold-faces, oppositely disposed cams to bring the two oppositely disposed carrier and coöperating mold-faces together and nest the respective layers of pulp carried by the faces, means to combine and compress the layers of pulp carried by one pair of mold-faces with the other layer supported by the other pair of mold-faces, means to separate the respective pairs of mold-faces, and air pressure means to transfer the articles from one of the pairs of mold-faces to the other mold-faces.

44. In a pulp molding machine, in combination, a rotating carrier provided with two oppositely disposed mold-faces in the two opposite side faces of the carrier, two movable arms having two coöperating mold-faces arranged for movement toward the carrier mold-faces, three vats, means for moving the carrier mold-faces in the inner vat, and the coöperating mold-faces in the two outer vats, respectively, a valve in each of the oscillating arms, means to operate the valves, suction apparatus for depositing layers of pulp on all four mold-faces, oppositely disposed cams to bring the two oppositely disposed carrier and coöperating mold-faces together and nest the respective layers of pulp carried by the faces, means to combine the layers of pulp carried by one pair of mold-faces with the other layer supported by the other pair of mold-faces, means to separate the respective pairs of mold-faces, air pressure means to transfer the articles from one of the pairs of mold-faces to the other mold-faces, and means to subsequently discharge the formed articles from the mold-faces to which they were transferred.

45. In a pulp molding machine, in combination, a traveling carrier provided with a mold-face let into its face, a vat, means to deposit pulp upon the mold-face, and means to scrape the face of the carrier.

46. In a pulp molding machine, in combination, a traveling carrier provided with a mold-face having a smooth face adjacent to the mold-face, a vat, means to deposit pulp upon the mold-face, and means to scrape the smooth face of the carrier for removing the pulp therefrom.

47. In a pulp molding machine, in combination, a rotating carrier provided with a mold-face having a smooth face adjacent to the mold-face, a vat, means to deposit pulp upon the mold-face, and means to scrape the smooth face of the carrier for removing the pulp therefrom.

48. In a pulp machine in combination, a traveling carrier having a mold face on each side thereof and located so as to be substantially oppositely disposed, two other mold faces, each of which coöperates with and is movable toward and away from one of the faces on said carrier, whereby two molds are oppositely disposed, means to deposit pulp on at least one face of each of said two molds, means to simultaneously press the movable faces of both molds against their coöperating faces on the carrier whereby the pressures are opposed to each other, thereby forming two articles simultaneously.

49. In a pulp molding machine, in combination, a series of traveling mold-faces, a series of coöperating mold-faces, two vats, means to deposit layers of pulp upon the traveling mold-faces in succession from one vat, means to deposit layers of pulp upon the coöperating mold-faces in succession from the other vat, means to bring the series of traveling and coöperating mold-faces successively together and nest the layers of pulp carried by the faces, means to successively combine the layers of pulp carried by one series of mold-faces with the layers supported by the other series of mold-faces, and means to successively separate the series of mold-faces.

50. In a pulp molding machine, in combination, a series of traveling mold-faces, a series of coöperating mold-faces, two vats, means to deposit layers of pulp upon the traveling mold-faces in succession from one vat, means to deposit layers of pulp upon the coöperating mold-faces in succession from the other vat, means to bring the series of traveling and coöperating mold-faces successively together and nest the layers of pulp carried by the faces, means to successively combine and compress the layers of pulp carried by one series of mold-faces with the layers supported by the other series of mold-faces, and means to successively separate the series of mold-faces.

51. In a pulp molding machine, in combination, a series of traveling mold-faces, a series of coöperating mold-faces, two vats, means to deposit layers of pulp upon the traveling mold-faces in succession from one vat, means to deposit layers of pulp upon the coöperating mold-faces in succession from the other vat, means to bring the series of traveling and coöperating mold-faces successively together and nest the layers of pulp carried by the faces, means to successively combine the layers of pulp carried by one series of mold-faces with the layers supported by the other series of mold-faces, means to successively separate the series of mold-faces, and means to subsequently discharge the formed articles from the series of mold faces, to which they were transferred.

52. In a pulp molding machine, in combination, a series of traveling mold-faces, a series of coöperating mold-faces, two pulp vats, means to deposit layers of pulp upon the traveling mold-faces in succession from one vat, means to deposit layers of pulp upon the coöperating mold-faces in succession from the other vat, means to bring the series of traveling and coöperating mold-faces successively together and nest the layers of pulp carried by the faces, means to combine the layers of pulp carried by one series of mold-faces with the layers supported by the other series of mold-faces, means to successively separate the two series of mold-faces, and air pressure means to transfer the articles from one series of mold-faces to the other series of mold-faces.

53. In a pulp molding machine, in combination, a series of traveling mold-faces, a series of coöperating mold-faces, two pulp vats, means to deposit layers of pulp upon the traveling mold-faces in succession from one vat, means to deposit layers of pulp upon the coöperating mold-faces in succession from the other vat, means to bring the series of traveling and coöperating mold-faces successively together and nest the layers of pulp carried by the faces, means to combine and compress the layers of pulp carried by one series of mold-faces with the layers supported by the other series of mold-faces, means to successively separate the two series of mold-faces, and air pressure means to transfer the articles from one series of mold-faces to the other series of mold-faces.

54. In a pulp molding machine, in combination, a series of traveling mold-faces, a series of coöperating mold-faces, two pulp vats, means to deposit layers of pulp upon the traveling mold-faces in succession from one vat, means to deposit layers of pulp upon the coöperating mold-faces in succession from the other vat, means to bring the series of traveling and coöperating mold-faces successively together and nest the layers of pulp carried by the faces, means to combine the layers of pulp carried by one series of mold-faces with the layers supported by the other series of mold-faces, means to successively separate the two series of mold-faces, air pressure means to transfer the articles from one series of mold-faces to the other series of mold-faces, and means to subsequently discharge the formed articles from the series of mold-faces to which they were transferred.

55. In a pulp molding machine, in combination, a series of traveling mold-faces, a series of coöperating mold-faces, two vats into each of which the series of mold-faces, respectively, dip to receive successive layers of pulp, means to deposit layers of pulp successively on both series of mold-faces, means to bring the series of traveling and coöperating mold-faces together and nest the layers of pulp carried by the faces, means to combine the layers of pulp carried by one series of mold-faces successively with the layers supported by the other series of mold-faces, and means to separate the two series of mold-faces successively.

56. In a pulp molding machine, in combination, a series of traveling mold-faces, a series of coöperating mold-faces, two vats into each of which the series of mold-faces, respectively, dip to receive successive layers of pulp, means to deposit layers of pulp successively on both series of mold-faces, means to bring the series of traveling and coöperating mold-faces together and nest the layers of pulp carried by the faces, means to combine and compress the layers of pulp carried by one series of mold-faces sucessively with the layers supported by the other series of mold-faces, and means to separate the two series of mold-faces successively.

57. In a pulp molding machine, in combination, a series of traveling mold-faces, a series of coöperating mold-faces, two vats into each of which the series of mold-faces, respectively, dip to receive successive layers of pulp, means to deposit layers of pulp successively on both series of mold-faces, means to bring the series of traveling and coöperating mold-faces together and nest the layers of pulp carried by the faces, means to combine the layers of pulp carried by one series of mold-faces successively with the layers supported by the other series of mold-faces, means to separate the two series of mold-faces successively, and means to subsequently discharge the formed articles from the series of mold-faces to which they were transferred.

58. In a pulp molding machine, in combination, a series of traveling mold-faces, a series of coöperating mold-faces, two pulp vats into each of which the series of mold-faces, respectively, dip to receive layers of pulp, suction apparatus for depositing layers of pulp successively upon both the series of mold-faces, means to bring the series of traveling and coöperating mold-faces together and nest the layers of pulp carried by one series of mold-faces with the layers supported by the other mold-faces successively, means to separate the series of mold-faces, successively, and air pressure means to transfer the articles from one series of mold-faces to the other series of mold-faces.

59. In a pulp molding machine, in combination, a series of traveling mold-faces, a series of coöperating mold-faces, two pulp vats into each of which the series of mold-faces, respectively, dip to receive layers of pulp, suction apparatus for depositing layers of pulp successively upon both the series of mold-faces, means to bring the series of traveling and coöperating mold-faces together and nest the layers of pulp carried by the faces, means to combine and compress the layers of pulp carried by one series of mold-faces with the layers supported by the other mold-faces successively, means to separate the series of mold-faces successively, and air pressure means to transfer the articles from one series of mold-faces to the other series of mold-faces.

60. In a pulp molding machine, in combination, a series of traveling mold-faces, a series of coöperating mold-faces, two pulp vats into each of which the series of mold-faces, respectively, dip to receive layers of pulp, suction apparatus for depositing layers of pulp successively upon both the series of mold-faces, means to bring the series of traveling and coöperating mold-faces together and nest the layers of pulp carried by the faces, means to combine the layers of pulp carried by one series of mold-faces with the layers supported by the other mold-faces successively, means to separate the series of mold-faces successively, air pressure means to transfer the articles from one series of mold-faces to the other series of mold-faces, and means to subsequently discharge the formed articles from the series of mold-faces to which they were transferred.

61. In a pulp molding machine, in combination, a rotating carrier provided with a series of mold-faces, a series of movable arms carried by the carrier and provided with mold-faces for coöperation with the mold-faces on the carrier, two pulp vats into each of which the series of mold-faces, respectively, dip to receive layers of pulp, means for rotating the carrier with its series of mold-faces in one vat, and the movable arms with its series of coöperating mold-faces in the other vat, suction apparatus for depositing layers of pulp successively upon both of the series of mold-faces, means to bring the carrier mold-faces and the coöperating mold-faces successively together and nest the layers of pulp carried by the two faces, means to combine the layers of pulp carried by one series of mold-faces with the layers supported by the other series of mold-faces, means to separate the two series of mold-faces successively, and air pressure means to transfer the articles from one series of mold-faces to the other mold-faces.

62. In a pulp molding machine, in combination, a rotating carrier provided with a series of mold-faces, a series of movable arms carried by the carrier and provided with mold-faces for coöperation with the mold-faces on the carrier, two pulp vats into each of which the series of mold-faces, respectively, dip to receive layers of pulp, means for rotating the carrier with its series of mold-faces in one vat, and the movable arms with its series of coöperating mold-faces in the other vat, suction apparatus for depositing layers of pulp successively upon both of the series of mold-faces, means to bring the carrier mold-faces and the coöperating mold-faces successively together and nest the layers of pulp carried by the two faces, means to combine and compress the layers of pulp carried by one series of mold-faces with the layers supported by the other series of mold-faces, means to separate the two series of mold-faces successively, and air pressure means to transfer the articles from one series of mold-faces to the other mold-faces.

63. In a pulp molding machine, in combination, a rotating carrier provided with a series of mold-faces, a series of movable arms carried by the carrier and provided with mold-faces for coöperation with the mold-faces on the carrier, two pulp vats into each of which the series of mold-faces, respectively, dip to receive layers of pulp, means for rotating the carrier with its series of mold-faces in one vat, and the movable arms with its series of coöperating mold-faces in the other vat, suction apparatus for depositing layers of pulp successively upon both of the series of mold-faces, means to bring the carrier mold-faces and the coöperating mold-faces successively together and nest the layers of pulp carried by the two faces, means to combine the layers of pulp carried by one series of mold-faces, with the layers supported by the other series of mold-faces, means to separate the two series of mold-faces successively, air pressure means to transfer the articles from one series of mold-faces to the other mold-faces, and means to subsequently discharge the formed articles from the series of mold-faces to which they were transferred.

64. In a pulp molding machine, in combination, a rotating carrier provided with a series of mold-faces, a series of oscillating arms carried by the carrier and provided with coöperating mold-faces, two pulp vats into each of which the series of mold-faces, respectively, dip to receive layers of pulp, means for rotating the carrier with its series of mold-faces in one vat, and the series of oscillating arms with the coöperating mold-faces in another vat, valves in the oscillating arms, means to operate the valves, suction apparatus for depositing layers of pulp on both of the series of mold-faces respectively, a cam to bring the series of carrier mold-faces and coöperating mold-faces together successively, and nest the layers of pulp carried by the two series of faces, means to combine the layers of pulp carried by one series of mold-faces with the layers supported by the other series of mold-faces, means to successively separate the two series of mold-faces, and air pressure means to transfer the articles from one series of mold-faces to the other series of mold-faces successively.

65. In a pulp molding machine, in combination, a rotating carrier provided with a series of mold-faces, a series of oscillating arms carried by the carrier and provided with coöperating mold-faces, two pulp vats into each of which the series of mold-faces, respectively, dip to receive layers of pulp, means for rotating the carrier with its series of mold-faces in one vat, and the series of oscillating arms with the coöperating mold-faces in another vat, valves in the oscillating arms, means to operate the valves, suction apparatus for depositing layers of pulp on both of the series of mold-faces respectively, a cam to bring the series of carrier mold-faces and coöperating mold-faces together successively, and nest the layers of pulp carried by the two series of faces, means to combine and compress the layers of pulp carried by one series of mold-faces with the layers supported by the other series of mold-faces, means to successively separate the two series of mold-faces, and air pressure means to transfer the articles from one series of mold-faces to the other series of mold-faces successively.

66. In a pulp molding machine, in combination, a rotating carrier provided with a series of mold-faces, a series of oscillating arms carried by the carrier and provided with coöperating mold-faces, two pulp vats into each of which the series of mold-faces, respectively, dip to receive layers of pulp, means for rotating the carrier with its series of mold-faces in one vat, and the series of oscillating arms with the coöperating mold-faces in another vat, valves in the oscillating arms, means to operate the valves, suction apparatus for depositing layers of pulp on both of the series of mold-faces respectively, a cam to bring the series of carrier mold-faces and coöperating mold-faces together successively, and nest the layers of pulp carried by the two series of faces, means to combine the layers of pulp carried by one series of mold-faces with the layers supported by the other series of mold-faces, means to successively separate the two series of mold-faces, air pressure means to transfer the articles from one series of mold-faces to the other series of mold-faces successively, and means to subsequently discharge the formed articles from the series of mold-faces to which they were transferred.

67. In a pulp molding machine, in combination, a traveling carrier provided with two series of oppositely disposed mold-faces in the two opposite side faces of the carrier, two series of movable arms each provided with coöperating mold-faces arranged for movement toward the carrier mold-faces, three vats, means for moving the series of carrier mold-faces successively in the inner vat, and the two series of coöperating mold-faces in the two outer vats, respectively, suction apparatus for depositing layers of pulp on both of the series of oppositely disposed mold-faces successively, means to bring the oppositely disposed carrier mold-faces and coöperating mold-faces together and nest the respective pairs of layers of pulp carried by the faces, means to combine the layers of pulp carried by the series of oppositely disposed coöperating mold-faces with the other layers supported by the oppositely disposed series of carrier mold-faces, means to separate the respective pairs of mold-faces successively, and air pressure means to transfer the articles from one series of pairs of mold-faces to the other series of mold-faces.

68. In a pulp molding machine, in combination, a traveling carrier provided with two series of oppositely disposed mold-faces in the two opposite side faces of the carrier, two series of movable arms each provided with coöperating mold-faces arranged for movement toward the carrier mold-faces, three vats, means for moving the series of carrier mold-faces successively in the inner vat, and the two series of coöperating mold-faces in the two outer vats, respectively, suction apparatus for depositing layers of pulp on both of the series of oppositely disposed mold-faces successively, means to bring the oppositely disposed carrier mold-faces and coöperating mold-faces together and nest the respective pairs of layers of pulp carried by the faces, means to combine and compress the layers of pulp carried by the series of oppositely disposed coöperating mold-faces with the other layers supported by the oppositely disposed series of carrier mold-faces, means to separate the respective pairs of mold-faces successively, and air pressure means to transfer the articles from one series of pairs of mold-faces to the other series of mold-faces.

69. In a pulp molding machine, in combination, a traveling carrier provided with two series of oppositely disposed mold-faces in the two opposite side faces of the carrier, two series of movable arms each provided with coöperating mold-faces arranged for movement toward the carrier mold-faces, three vats, means for moving the series of carrier mold-faces successively in the inner vat, and the two series of coöperating mold-faces in the two outer vats, respectively, suction apparatus for depositing layers of pulp on both of the series of oppositely disposed mold-faces successively, means to bring the oppositely disposed carrier mold-faces and coöperating mold-faces together and nest the respective pairs of layers of pulp carried by the faces, means to combine the layers of pulp carried by the series of oppositely disposed coöperating mold-faces with the other layers supported by the oppositely disposed series of carrier mold-faces, means to separate the respective pairs of mold-faces successively, air pressure means to transfer the articles from one series of pairs of mold-faces to the other series of mold-faces, and means to subsequently discharge the formed articles from the series of oppositely disposed mold-faces to which they were transferred.

70. In a pulp molding machine, in combination, a rotating carrier provided with a series of oppositely disposed mold-faces in the two opposite side faces of the carrier, two series of movable arms each provided with coöperating mold-faces arranged for movement toward the carrier faces, three vats, means for moving the two series of carrier mold-faces in the inner vat successively, and the two series of coöperating faces in the two outer vats, respectively, suction apparatus for depositing layers of pulp upon all four series of faces respectively, oppositely disposed cams to bring the two oppositely disposed series of carrier and coöperating mold-faces together, and nest the respective layers of pulp carried by the faces, means to combine the layers of pulp carried by one pair of the series of oppositely disposed mold-faces with the other layers supported by the other pair of oppositely disposed mold-faces successively, means to separate the respective pairs of mold-faces in succession, and air pressure means to transfer the articles from one series of pairs of mold-faces to the other mold-faces.

71. In a pulp molding machine, in combination, a rotating carrier provided with a series of oppositely disposed mold-faces in the two opposite side faces of the carrier, two series of movable arms each provided with coöperating mold-faces arranged for movement toward the carrier faces, three vats, means for moving the two series of carrier mold-faces in the inner vat successively, and the two series of coöperating faces in the two outer vats, respectively, suction apparatus for depositing layers of pulp upon all four series of faces respectively, oppositely disposed cams to bring the two oppositely disposed series of carrier and coöperating mold-faces together, and nest the respective layers of pulp carried by the faces, means to combine and compress the layers of pulp carried by one pair of the series of oppositely disposed mold-faces with the other layers supported by the other pair of oppositely disposed mold-faces successively, means to separate the respective pairs of mold-faces in succession, and air pressure means to transfer the articles from one series of pairs of mold-faces to the other mold faces.

72. In a pulp molding machine, in combination, a rotating carrier provided with a series of oppositely disposed mold-faces in the two opposite side faces of the carrier, two series of movable arms each provided with coöperating mold-faces arranged for movement toward the carrier faces, three vats, means for moving the two series of carrier mold-faces in the inner vat successively, and the two series of coöperating faces in the two outer vats, respectively, suction apparatus for depositing layers of pulp upon all four series of faces respectively, oppositely disposed cams to bring the two oppositely disposed series of carrier and coöperating mold-faces together, and nest the respective layers of pulp carried by the faces, means to combine the layers of pulp carried by one pair of the series of oppositely disposed mold-faces with the other layers supported by the other pair of oppositely disposed mold-faces successively, means to separate the respective pairs of mold-faces in succession, air pressure means to transfer the articles from one series of pairs of mold-faces to the other mold-faces, and means to subsequently discharge the formed articles from the series of oppositely disposed mold-faces to which they were transferred.

73. In a pulp molding machine, in combination, a rotating carrier provided with two oppositely disposed series of mold-faces in the two opposite side faces of the carrier, two series of movable arms each provided with coöperating mold-faces arranged for movement toward the carrier mold-faces, three vats, means for moving the series of carrier mold-faces successively in the inner vat and the two series of coöperating mold-faces in the two outer vats, respectively, a valve in each of the oscillating arms, means to operate the valves, suction apparatus for depositing layers of pulp upon all of the four series of mold-faces in succession, oppositely disposed cams to bring the two series of oppositely disposed carrier mold-faces and coöperating mold-faces together, and nest the respective layers of pulp carried by the faces, means to combine the layers of pulp carried by one series of mold-faces successively, with the other layers supported by the other series of mold-faces, means to separate the respective pairs of mold-faces successively, and air pressure means to transfer the articles from one of the pairs of mold-faces successively to the other mold-faces.

74. In a pulp molding machine, in combination, a rotating carrier provided with two oppositely disposed series of mold-faces in the two opposite side faces of the carrier, two series of movable arms each provided with coöperating mold-faces arranged for movement toward the carrier mold-faces, three vats, means for moving the series of carrier mold-faces successively in the inner vat and the two series of coöperating mold-faces in the two outer vats, respectively, a valve in each of the oscillating arms, means to operate the valves, suction apparatus for depositing layers of pulp upon all of the four series of mold-faces in succession, oppositely disposed cams to bring the two series of oppositely disposed carrier mold-faces and coöperating mold-faces together, and nest the respective layers of pulp carried by the faces, means to combine and compress the layers of pulp carried by one series of mold-faces successively, with the other layers supported by the other series of mold-faces, means to separate the respective pairs of mold-faces successively, and air pressure means to transfer the articles from one of the pairs of mold-faces successively to the other mold-faces.

75. In a pulp molding machine, in combination, a rotating carrier provided with two oppositely disposed series of mold-faces in the two opposite side faces of the carrier, two series of movable arms each provided with coöperating mold-faces arranged for movement toward the carrier mold-faces, three vats, means for moving the series of carrier mold-faces successively in the inner vat and the two series of coöperating mold-faces in the two outer vats, respectively, a valve in each of the oscillating arms, means to operate the valves, suction apparatus for depositing layers of pulp upon all of the four series of mold-faces in succession, oppositely disposed cams to bring the two series of oppositely disposed carrier mold-faces and coöperating mold-faces together, and nest the respective layers of pulp carried by the faces, means to combine the layers of pulp carried by one series of mold-faces successively, with the other layers supported by the other series of mold-faces, means to separate the respective pairs of mold-faces successively, air pressure means to transfer the articles from one of the pairs of mold-faces successively to the other mold-faces, and means to subsequently discharge the formed articles from the mold-faces successively to which they were transferred.

Signed at Hartford, Connecticut, this 18th day of March, 1907.

WILLIAM A. LORENZ.

Witnesses:
JOSEPH MERRITT,
NELLIE PHOENIX.